United States Patent [19]

Sievert et al.

[11] Patent Number: 5,199,729
[45] Date of Patent: Apr. 6, 1993

[54] STOWABLE SHELF BAG CART

[75] Inventors: Sheldon H. Sievert, Alexandria; John H. Hoeper; John V. Silver, both of Glenwood, all of Minn.

[73] Assignee: Watkins Aircraft Support Products, Inc., Glenwood, Minn.

[21] Appl. No.: 736,524

[22] Filed: Jul. 26, 1991

[51] Int. Cl.$^5$ .............................................. B62B 3/02
[52] U.S. Cl. ................................. 280/47.35; 108/15; 248/240.4; 280/79.11; 280/79.2; 312/315
[58] Field of Search ................ 280/47.35, 47.18, 47.34, 280/79.11, 79.2, 79.3; 248/240, 240.4, 242, 244; 108/15, 33, 18, 117, 120; 312/315; 211/144, 150

[56] References Cited

U.S. PATENT DOCUMENTS

| | | | |
|---|---|---|---|
| 3,782,746 | 1/1974 | Isaacs | 280/79.3 |
| 3,861,702 | 1/1975 | Wilson | 280/47.35 |
| 3,891,228 | 6/1975 | Rhinehart et al. | 211/149 |
| 3,920,260 | 11/1975 | Downing | 280/79.3 |
| 4,275,665 | 6/1981 | Silverman | 280/79.3 |
| 4,450,969 | 5/1984 | Marsh, Jr. | 280/79.3 |
| 4,512,591 | 4/1985 | Plante | 280/47.35 |

FOREIGN PATENT DOCUMENTS 1951013 8/1978 Fed. Rep. of Germany ..... 280/79.2
2024735 1/1980 United Kingdom ............. 280/47.35

Primary Examiner—Eric D. Culbreth
Attorney, Agent, or Firm—Moore & Hansen

[57] ABSTRACT

The stowable shelf bag cart of the present invention includes a base portion resting on a wheeled chassis. The base portion includes a fixed lower shelf. A frame extends upwardly from the base portion, and includes four upright corner members connected at their upper ends by four lateral braces. The two ends of the cart are enclosed by end walls and a cover extends over the top of the cart. A stowable shelf is placed approximately halfway between the base and the top of the frame. The shelf includes axial projections at both ends that glide within a track fixed to each end wall. One other projection is located at each of the four corners of the stowable shelf. These projections are slidably received in tracks that are integral with the four upright corner members above the level of the stowable shelf. Latches are provided that securely lock the stowable shelf in the shelf position, yet permit the shelf to be easily adjusted to a right or left side wall position by one person without using any tools.

6 Claims, 5 Drawing Sheets

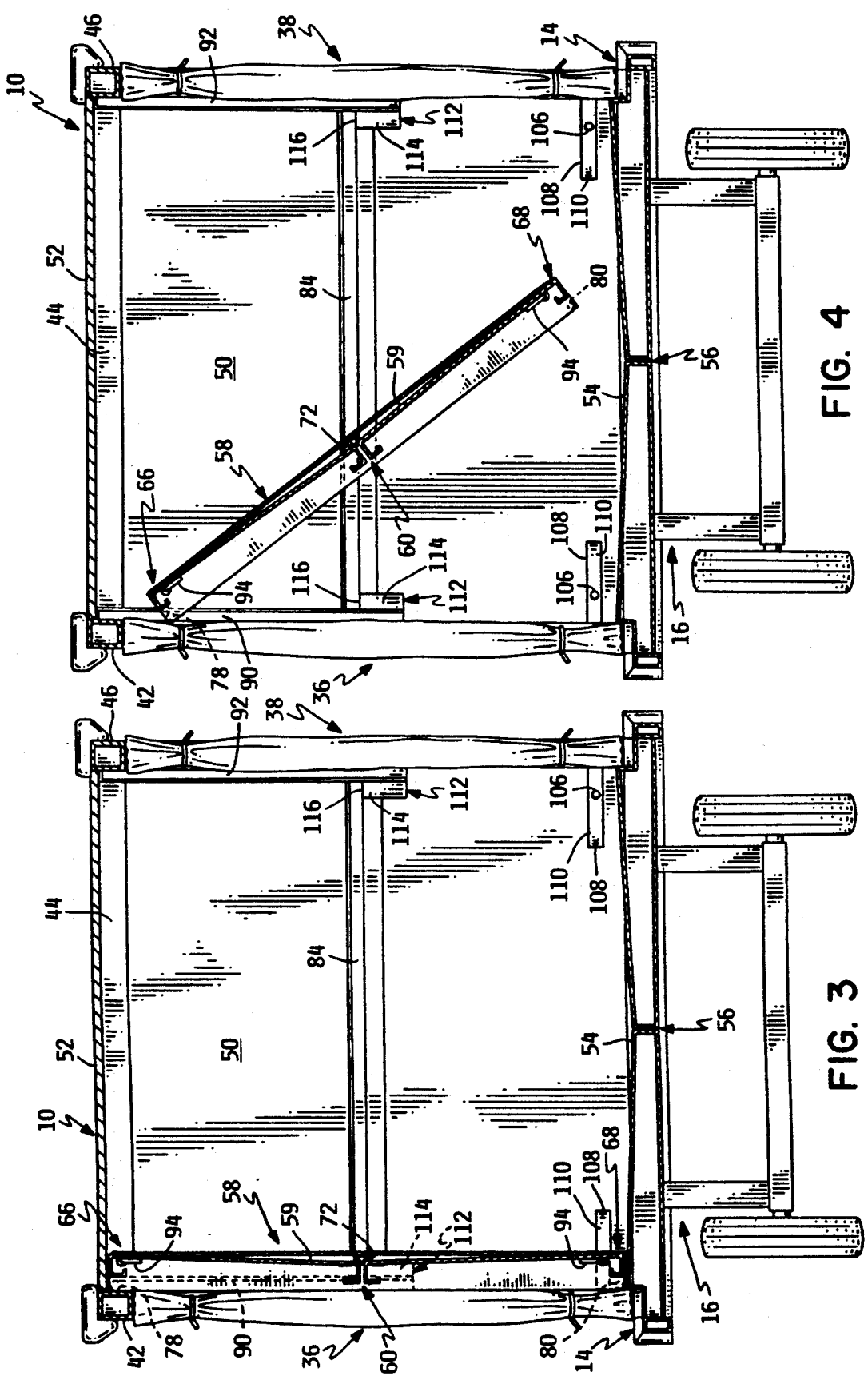

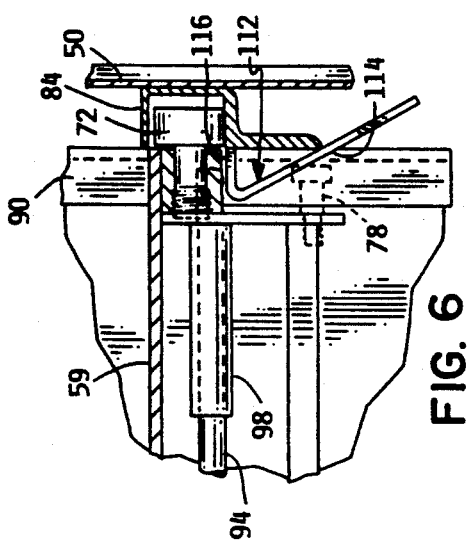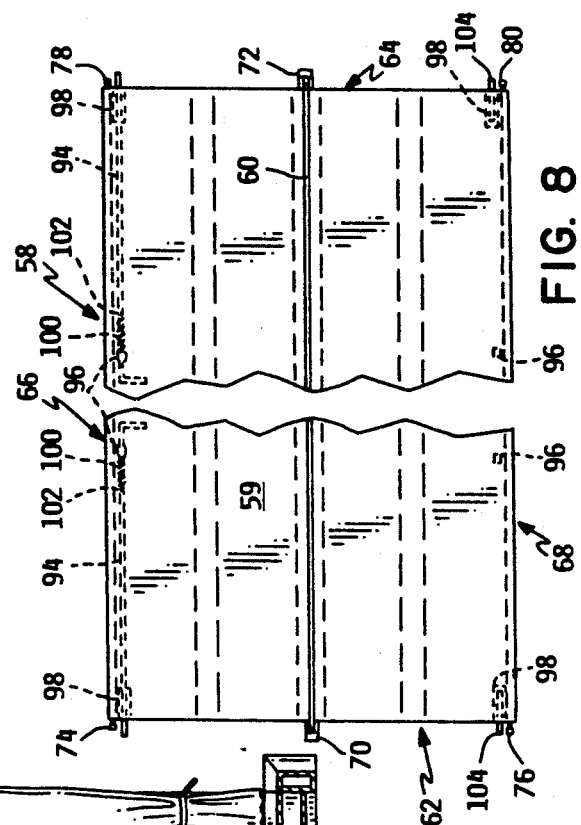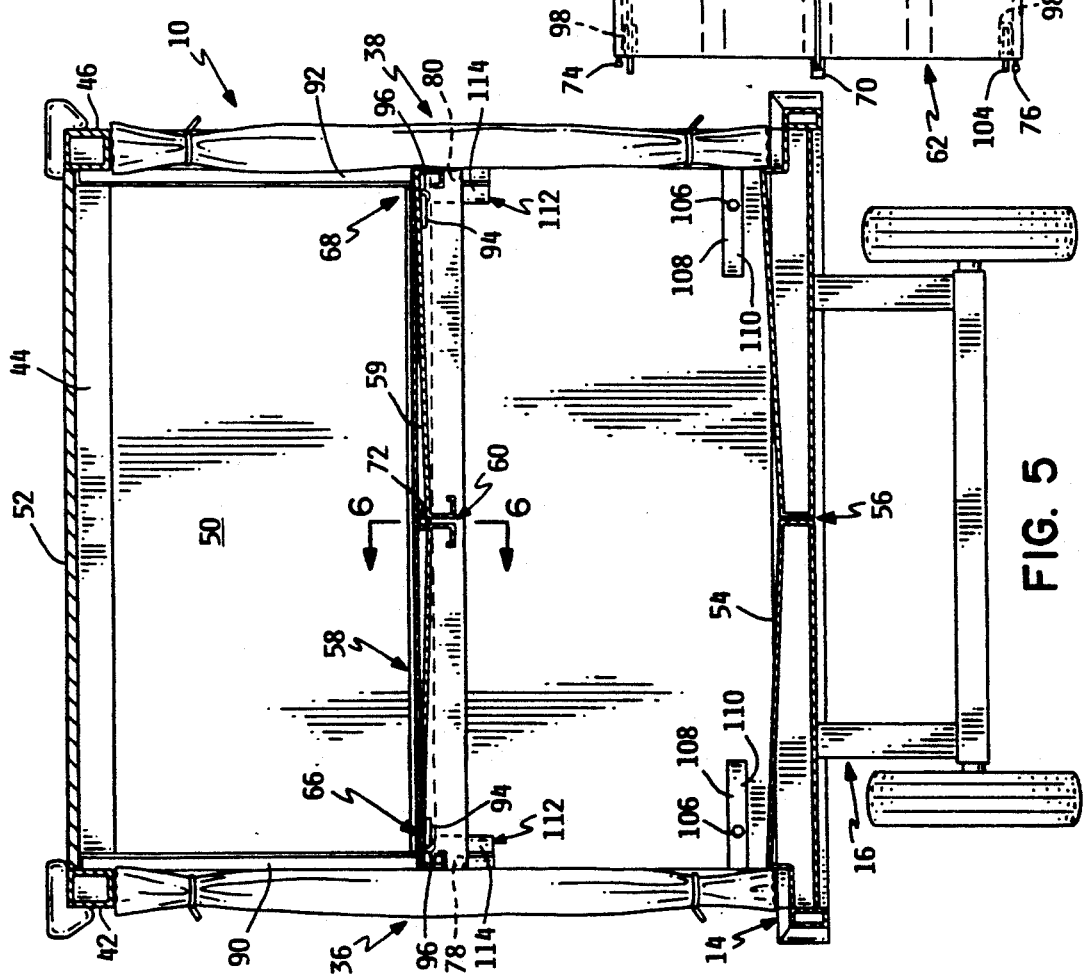

STOWABLE SHELF BAG CART

BACKGROUND OF THE INVENTION

1. Technical Field

The present invention relates generally to cart constructions and particularly to carts having a rigid frame and a repositionable shelf for moving relatively large items such as baggage or cargo and the like.

2. Background Information

Carts of various types for baggage handling on airport flight lines are well known. Such carts, groups of which are generally towed by tractors, frequently include two fixed shelves for holding two layers of luggage and the like, with each shelf usually accessible from both sides of the bag cart.

Often, however, oversize luggage or cargo too large for storage on a shelf will require a separate piece of equipment to be transported. When this occurs, the needed piece of equipment is often not close at hand, and much time may be needed to find and retrieve it from a storage area after hitching it to a tractor. Some bag carts may be equipped with a removable upper shelf, but the removal operation is frequently slow and cumbersome, and may require special tools and more than one person to perform.

In some instances a cargo cart is preferred, rather than a bag cart, that permits access to the cart from only one side, with no middle shelf. Yet those who need both styles of cart have needed to keep both types on hand since no single cart has been able to meet both sets of needs. When bag carts are being used on an airport flight line for unloading luggage from an aircraft cargo hold, there may be no way of knowing what type of cart will be needed until the baggage is actually coming out of the plane. In such instances, where there is no time to search for and retrieve the appropriate bag cart, there has been nothing available to allow a single worker to quickly and easily, without the need for special tools, convert a cart having a shelf to one having no shelf and a right or left side wall, or vice versa.

The stowable shelf bag cart of the present invention overcomes the difficulties described above and affords other features and advantages previously not available.

SUMMARY OF THE INVENTION

The stowable shelf bag cart of the present invention includes a base portion resting on a wheeled chassis. The base portion includes a fixed lower shelf. A frame extends upward from the base portion, and includes four upright corner members connected at their upper ends by four lateral braces. The two ends of the cart are enclosed by end walls and a cover extends over the top of the cart.

A stowable shelf is placed approximately halfway between the base and the top of the frame. The shelf includes axial projections at both ends that glide within a track fixed to each end wall. One other projection is located at each of the four corners of the stowable shelf. These projections are slidably received in tracks that are integral with the four upright corner members above the level of the stowable shelf. Latches are provided that securely lock the stowable shelf in the shelf position, yet permit the shelf to be easily adjusted to a right or left side wall position by one person without using any tools.

It is an object of the invention to provide a versatile bag cart that permits an operator working alone quickly and easily to reposition a stowable shelf between a shelf position and right and left side wall positions. It is a further object of this invention to provide a secure latching mechanism that locks the stowable shelf in the selected position and may be easily unlocked when needed without the possibility of inadvertently unlocking itself. The cart has been designed to permit the stowable shelf to be unlatched, repositioned and relatched in less than ten seconds.

It is a further object of this invention to provide a bag cart that permits an operator working alone to reposition a stowable shelf without risk of injury and without having to climb inside the bag cart. It is also an object of this invention to maintain the bag cart in a stable condition without risk of tipping over whatever the position of the stowable shelf and the contents of the bag cart. It is a further object of this invention to minimize the possibility of the stowable shelf, which utilizes rails and tracks, becoming inadvertently untracked.

Other objects and advantages of the invention will become apparent from the following detailed description and from the appended drawings in which like numbers have been used to describe like parts throughout the several views.

BRIEF DESCRIPTION OF THE DRAWINGS

FIG. 3 is a section view taken along line 3—3 of FIG. 1;

FIG. 4 is a section view similar to that of FIG. 3 showing the stowable shelf midway between the right or first side stowed position and the shelf position;

FIG. 5 is a section view similar to those of FIGS. 3 and 4 showing the stowable shelf in the shelf position;

FIG. 6 is a partial section view of the latching mechanism taken from line 6—6 of FIG. 5;

FIG. 8 is a plan view of the stowable shelf removed from the bag cart, showing an alternate embodiment of the stowable shelf.

DESCRIPTION OF THE PREFERRED EMBODIMENT

Figure 1:
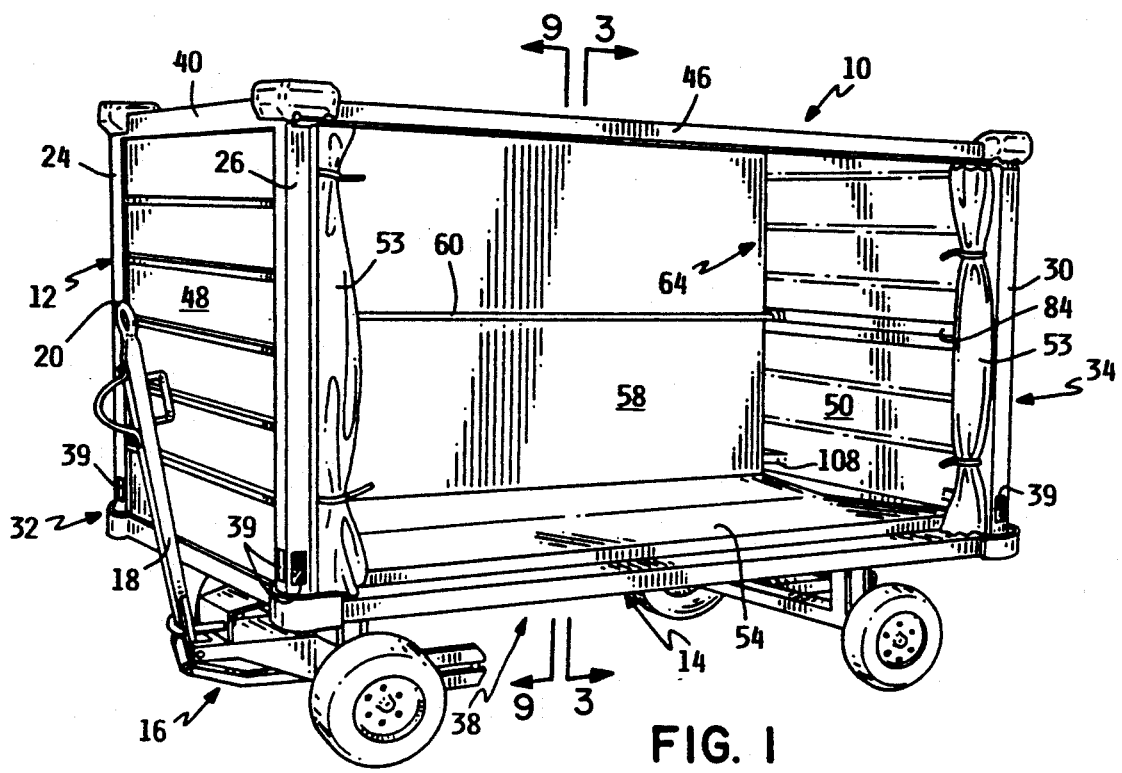
FIG. 1 is a perspective view of the bag cart with the stowable shelf in the right or first side stowed position.

With reference to the drawings, and in particular to FIG. 1, the stowable shelf bag cart is generally indicated by reference numeral 10. Bag cart 10 includes a frame 12 having a base 14 fixed to chassis or running gear 16.

Figure 7:
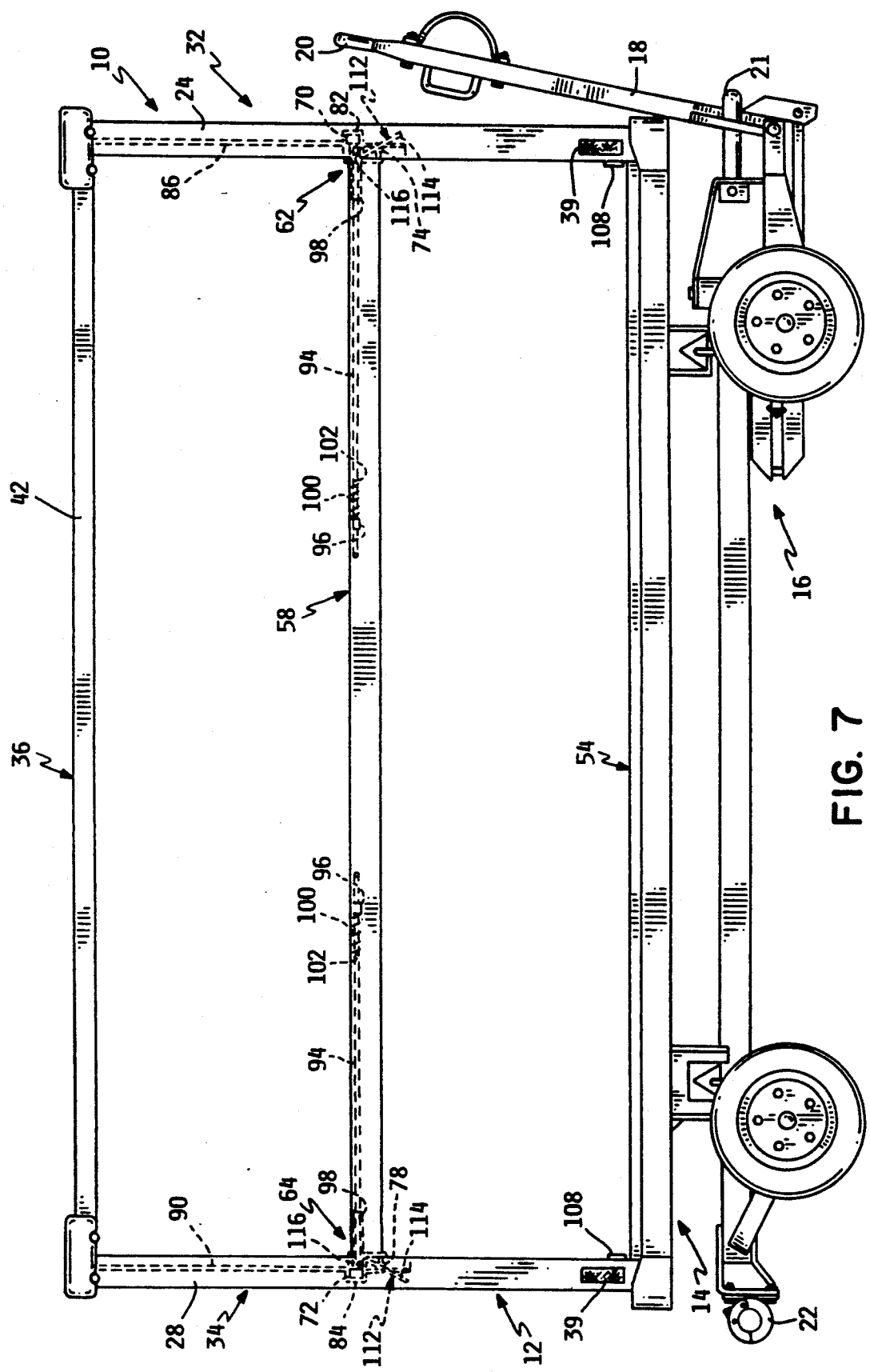
FIG. 7 is a side elevation of the right or first side of the bag cart, showing the stowable shelf in the shelf position.

Chassis 16 includes towbar 18 having a hitch receiving means such as collar 20 projecting from the end thereof. Chassis 16 is designed to permit several bag carts 10 to be towed in a train by a single tractor or similar vehicle. Further, chassis 16 preferably permits automatic actuation of the brakes of the front wheels thereof upon raising towbar 18 until it latches in the position shown in FIGS. 1 and 2. The parking brake may be released by pulling up parking brake latch 21, shown in FIG. 7, while pushing in on the top of towbar 18. When towbar 18 unlatches, the operator may lower it and release parking brake latch 21. Mounted to the rear end of chassis 16 is also preferably a trailer hitch such as pintle hook 22 (FIG. 7). Pintle hook 22 cooperates with collar 20 of a second bag cart 10 to permit the linkage of a series of bag carts 10 for towing. In the preferred embodiment of bag cart 10, towbar 18 preferably has an overall length of approximately 36½ inches.

Frame 12 includes base 14, from which the remainder of frame 12 upwardly extends. Frame 12 also includes first upright corner member 24, second upright corner member 26, third upright corner member 28 and fourth upright corner member 30. Frame 12 includes front or first end 32 and rear or second end 34, and right or first side 36 and left or second side 38 (as bag cart 10 is observed when facing pintle hook 22). Frame first end 32 extends between first upright corner member 24 and second upright corner member 26, and frame second end 34 extends between third upright corner member 28 and fourth upright corner member 30. Similarly, frame first side 36 extends between first upright corner member 24 and third upright corner member 28, and frame second side 38 extends between second upright corner member 26 and fourth upright corner member 30. Reflectors 39 are attached to bag cart 10, preferably to upright corner members 24, 26, 28, 30, as safety features to improve the visibility of bag cart 10 to other vehicular traffic on the flight line.

Figure 9:
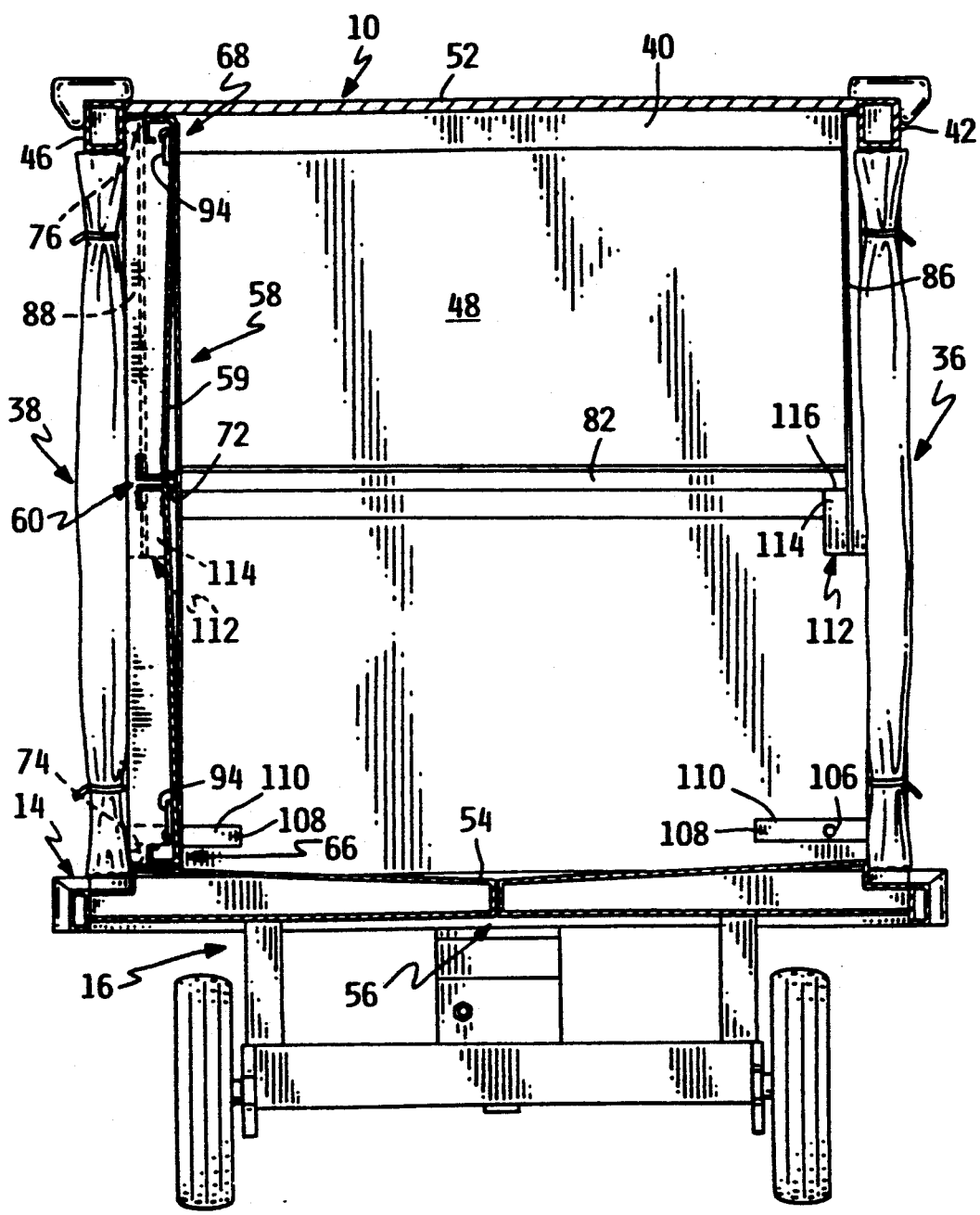
FIG. 9 is a section view taken along line 9—9 of FIG. 1, with the storable shelf shown in the left or second side stowed position.

Frame 12 also includes first lateral brace member 40, second lateral brace member 42, third lateral brace member 44 and fourth lateral brace member 46. First lateral brace member 40 extends between the top of first upright corner member 24 and the top of second upright corner member 26, and second lateral brace member 42 extends between the top of third upright corner member 28 and fourth upright corner member 30. Similarly, third lateral brace member 44 extends between the top of first upright corner member 24 and the top of third upright corner member 28, and fourth lateral brace member 46 extends between the top of second upright corner member 26 and the top of fourth upright corner member 30. In the preferred embodiment, first end wall 48 encloses first end 32 of bag cart 10, and second end wall 50 encloses second end 34 of bag cart 10. It is preferred that second end wall 50 be identical in configuration to first end wall 48, as illustrated in FIG. 9. It is also preferred that a roof 52 extending between the four brace members be supplied to help protect cargo loaded on bag cart 10 from inclement weather. Protection from inclement weather also may be provided along first and second sides 36, 38 of bag cart 10 as, for example, by vinyl curtains 53 hanging from second and fourth lateral brace members 42, 46.

The cross section of bed or floor portion 54 of base 14 of ba cart 10 is preferably in the shape of a flattened "V" with a longitudinal gap or break 56 running along the axis between first end 32 and second end 34. The flattened "V" profile funnels water toward break 56, permitting drainage of rain water from floor 54, as well as providing a gravity assist to bias baggage resting on floor 54 toward the center of bag cart 10 to help maintain baggage in position on floor 54 while bag cart 10 is being moved from one location to another.

As with floor 54, the cross section of stowable shelf 58 illustrates a storage surface 59 that is also preferably in the shape of a flattened "V" with a longitudinal gap or break 60, seen most clearly in FIGS. 3-5. The flattened "V" profile of storage surface 59 funnels water toward break 60, which permits drainage of rain water from stowable shelf 58, as well as providing a gravity assist to bias baggage resting on storage surface 59 toward the center of bag cart 10 to help maintain baggage in position on stowable shelf 58 while bag cart 10 is being moved from one location to another. Stowable shelf 58 includes a first end 62 adjacent to first end 32 of frame 12, and a second end 64 adjacent to second end 34 of frame 12. Stowable shelf 58 also includes a first side 66 corresponding to first side 36 of frame 12, and a second side 68 corresponding to second side 38 of frame 12. Stowable shelf 58 pivots, as shall be described, along an axis coincident with break 60, located approximately midway between shelf first side 66 and shelf second side 68, and extending from shelf first end 62 to shelf second end 64.

As most clearly illustrated in FIG. 8, stowable shelf 58 includes first and second primary rollers or cam followers 70, 72, projecting from first end 62 and second end 64, respectively, thereof. Primary rollers 70, 72 project from stowable shelf 58 along its axis, which is coincident with break 60. Also projecting from stowable shelf 58 are first, second, third and fourth secondary rollers or cam followers 74, 76, 78, 80, respectively. First and second secondary rollers 74, 76 project from first end 62 of stowable shelf 58, and third and fourth secondary rollers 78, 80 project from second end 64 thereof.

Each of the primary and secondary rollers are slidably received within tracks in which the rollers glide. First and second primary rollers 70, 72 are preferably permanently captured within first and second primary guides or tracks 82, 84, respectively. First and second primary tracks 82, 84 are mounted horizontally on first and second end walls 48, 50, respectively. As may be seen in FIGS. 1, 3 and 4, second primary track 84 is horizontally mounted to second end wall 5 approximately midway between floor 54 and third lateral brace member 44. Similarly, first primary track 82 is horizontally mounted to first end wall 48 approximately midway between floor 54 and first lateral brace member 40.

In the preferred embodiment, secondary rollers 74, 76, 78, 80 are releasably captured within first, second, third and fourth secondary guides or tracks, 86, 88, 90, 92, respectively. First secondary track 86 is mounted to first upright corner member 24 and second secondary track 88 is mounted to second upright corner member 26. Similarly, third secondary track 90 is mounted to third upright corner member 28 and fourth secondary track 92 is mounted to fourth upright corner member 30. When stowable shelf 58 is positioned as illustrated in FIGS. 3 and 4, first and third secondary rollers 74, 78 are captured in first and third secondary tracks 86, 90, respectively, while second and fourth secondary rollers 76, 80 are not constrained within any containment means. FIG. 3 illustrates stowable shelf 58 in the first sidewall position. Similarly, stowable shelf 58 may be located in positions complementing those illustrated in FIGS. 3 and 4, but resulting in stowable shelf 58 being generally vertically positioned along second side 38 of bag cart 10 rather than along first side 36. FIG. 9 illustrates stowable shelf 58 in the second sidewall position. When so positioned, second and fourth secondary rollers 76, 80 of stowable shelf 58 are captured in second and fourth secondary tracks 88, 92, respectively, while first and third secondary rollers 74, 78 are not constrained within any containment means. When stowable shelf 58 is located in the usable shelf position illustrated in FIGS. 2 and 5, all of first, second, third and fourth secondary rollers 74, 76, 78, 80, are captured in first, second, third and fourth secondary tracks 86, 88, 90, 92, respectively.

In the preferred embodiment, stowable shelf 58 may be retained in either a first or right sidewall position (illustrated in FIG. 3), a second or left sidewall position (not shown) or a shelf position (FIG. 5) by latch means including an L-shaped latching pin 94. With reference to FIG. 8, latching pin 94 is retained in position underneath stowable shelf 58 by first and second latching pin guides 96, 98. Further, latching pin 94 is maintained in its standard projecting position by spring 100 which is positioned between first latching pin guide 96 and spring retainer pin 102. Spring retainer pin 102 is preferably a roll pin affixed to the shaft of latching pin 94. A pair of latching pins 94 are supplied for each of first and second sides 66, 68 of stowable shelf 58, although an alternate embodiment, illustrated in FIG. 8, includes latching pins 94 on only first side 66. Second side 68 includes a pair of fixed pins 104 that are fixedly retained in second latching pin guides 98. In this embodiment, first latching pin guides 96 are also supplied on second side 68 so that the user may, if preferred, replace fixed pins 104 with latching pins 94. Further, it should be noted that the arrangement illustrated in FIG. 8 may be reversed, with latching pins 94 supplied on second side 68 and fixed pins 104 supplied on first side 66 of stowable shelf 58.

To lock the preferred embodiment of stowable shelf 58 in the vertical or upright position on first side 36 of bag cart 10, as illustrated in FIGS. 1 and 3, the latching pins 94 on second side 68 of stowable shelf 58 each engage an aperture 106 of latching pin catch 108. Catches 108 are located on first and second end walls 48, 50 of bag cart 10. A catch 108 is positioned adjacent each of first, second, third and fourth upright corner members 24, 26, 28, 30 near floor 54. Catch 108 is slightly tapered outwardly from its inner edge toward aperture 106 so that as the edge of stowable shelf 58 adjacent second side 68 moves toward catch 108, latching pins 94, which protrude beyond first and second ends 62, 64 of stowable shelf 58, ride up ramped portion 110 of catch 108 toward aperture 106. As latching pin 94 moves across ramp 110 spring 100 is compressed, until latching pin 94 reaches aperture 106, when spring 100 expands to cause latching pin 94 to project into and through aperture 106, engaging catch 108. Similarly, to lock stowable shelf 58 in the vertical or upright position on second side 38 of bag cart 10, the latching pins 94 on first side 66 of stowable shelf 58 each engage aperture 106 of latching pin catch 108.

Figure 2:
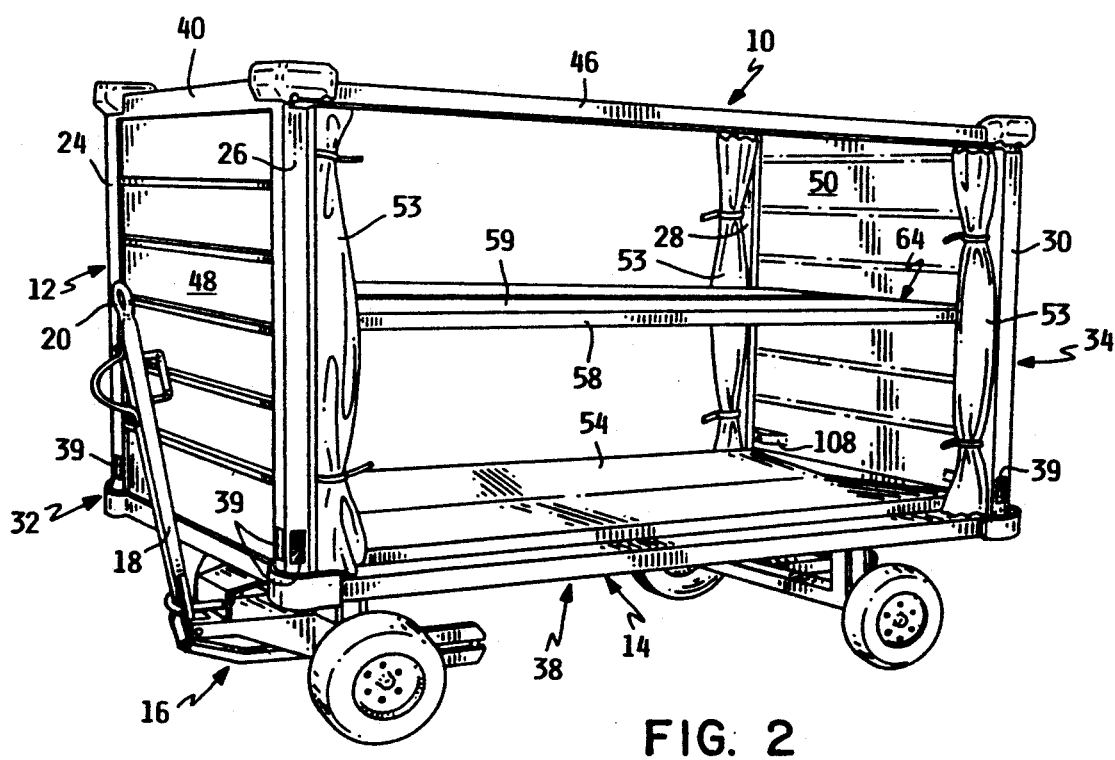
FIG. 2 is a perspective view of the bag cart with the stowable shelf in the shelf position.

To lock the preferred embodiment of stowable shelf 58 in the horizontal, shelf position illustrated in FIGS. 2 and 5, all four latching pins 94 engage pin stops 112 (FIG. 6). Pin stops 112 are located on first and second end walls 48, 50 of bag cart 10, and include a ramped portion 114 and a level, generally horizontal rest portion 116. When engaged with pin stops 112, latching pins 94 rest on rest portion 116. When moving, for example, from the upright position on first side 36 of bag cart 10 illustrated in FIGS. 1 and 3 to the shelf position illustrated in FIGS. 2 and 5, both latching pins 94 adjacent second side 68 of stowable shelf 58 ride up ramped portions 114 of pin stops 112 located on second side 38 of bag cart 10 toward rest portions 116. As latching pins 94 move across ramps 114 springs 100 are compressed, until latching pins 94 reach rest portions 116, when springs 100 expand to cause latching pins 94 to project across and above rest portions 116, engaging pin stops 112. Similarly, when moving from the upright position on second side 38 of bag cart 10 to the shelf position illustrated in FIGS. 2 and 5, both latching pins adjacent first side 66 of stowable shelf 58 ride up ramped portions 114 of pin stops 112 located on first side 36 of bag cart 10 toward rest portions 116. Thus when stowable shelf 58 is in its shelf position, all four latching pins 94 project across and above rest portions 116, assuring secure storage of items resting thereon.

In use, stowable shelf bag cart 10 may easily be operated by a single person. To move stowable shelf 58 from the shelf position to the upright wall position, the operator stands on the side of bag cart 10 that will remain open. The operator pulls the two latching pins 94 on that side of stowable shelf 58 toward each other, thereby unlatching them by disengaging them from pin stops 112. With a slight push downward and away, stowable shelf 58 will glide down and away into the upright, stowed position. Both latching pins 94 on the far side of the cart will slide up into and along the secondary tracks located on that side of the cart, and springs 100 will automatically cause the remaining latching pins 94 to engage apertures 106 on catches 108 on the same side of the cart. Before using bag cart 10, however, care should always be taken to ensure that latching pins 94 have engaged apertures 106 on catches 108.

Similarly, to return stowable shelf 58 to the usable shelf position, the operator stands behind the upright, back wall and pulls the two bottom latching pins 94 toward each other. With a slight push away, the top of shelf 58 will come down and the bottom will move up and away, shelf 58 thus moving into the shelf position. Stowable shelf 58 will move easily downward on the side the operator is standing, and the operator must not lean into the storage area of bag cart 10 after pushing away the bottom of shelf 58 as the top of shelf 58 will be gliding downward. All four spring loaded latching pins 94 should latch their respective pin stops 112 automatically when stowable shelf 58 reaches its usable shelf position, but care should be taken to ensure that latching pins 94 are securely latched before operating bag cart 10.

While the preferred embodiments of the invention have been described, it should be understood that various changes, adaptations, and modifications may be made therein without departing from the spirit of the invention and the scope of the appended claims.

What is claimed is:

1. An equipment transport cart comprising:
  a wheeled chassis;
  a frame having a base, a first end, a second end, a first side and a second side, said base mounted to and said frame extending upwardly from said wheeled chassis;
  a shelf member having a first end, a second end, a first side and a second side, said first end of said shelf member mounted to said first end of said frame and said second end of said shelf member mounted to said second end of said frame, said shelf member being pivotably and slidably connected to said first and second ends of said frame along an axis approximately midway between its said first side and its said second side and extending from its said first end to its said second end, said shelf member being selectively pivotable between at least a first side wall position coincident with said first side of said frame and a shelf position;

latch means, whereby said shelf member may be releasably retained in said first side wall position, said shelf position or a second side wall position;

first, second, third and fourth upright corner members, said first end of said frame extending between said first and second upright corner members, said second end of said frame extending between said third and fourth upright corner members, said first side of said frame extending between said first and third upright corner members, and said second side of said frame extending between said second and fourth upright corner members;

first, second, third and fourth lateral brace members, said first lateral brace member extending between said first and second upright corner members, said second lateral brace member extending between said third and fourth upright corner members, said third lateral brace member extending between said first and third upright corner members, and said fourth lateral brace member extending between said second and fourth upright corner members;

first and second axial projections opposably extending from said axis of said shelf member, said first axial projection extending from said first end of said shelf member and said second axial projection extending from said second end of said shelf member;

first, second, third and fourth end projections, said first end projection extending from said first end of said shelf member adjacent said first side of said shelf member, said second end projection extending from said first end of said shelf member adjacent said second side of said shelf member, said third end projection extending from said second end of said shelf member adjacent said first side of said shelf member, and said fourth end projection extending from said second end of said shelf member adjacent said second side of said shelf member;

first and second axial channel members, said first axial channel member extending between and fixedly attached to said first and second upright corner members of said frame and slidably engageable with said first axial projection of said shelf member, and said second axial channel member extending between and fixedly attached to said third and fourth upright corner members of said frame and slidably engageable with said second axial projection of said shelf member; and first, second, third and fourth channel members, said first channel member integral with and extending along a portion of said first upright corner member of said frame and slidably engageable with said first end projection of said shelf member, said second channel member integral with and extending along a portion of said second upright corner member of said frame and slidably engageable with said second end projection of said shelf member, said third channel member integral with and extending along a portion of said third upright corner member of said frame and slidably engageable with said third end projection of said shelf member, and said fourth channel member integral with and extending along a portion of said fourth upright corner member of said frame and slidably engageable with said fourth end projection of said shelf member.

2. An equipment transport cart as described in claim 1, said latch means comprising:

first and second latching means, said first latching means mounted to said shelf member adjacent said first side of said shelf member and said second latching means mounted to said shelf member adjacent said second side of said shelf member; and first and second latch receiving means, said first latch receiving means mounted on said first side of said frame to cooperate with said first latching means, and said second latch receiving means mounted on said second side of said frame to cooperate with said second latching means.

3. An equipment transport cart as described in claim 2, wherein said first and second latching means each include at least one latching pin; and said latch receiving means includes a multiplicity of latching pin receiving members mounted adjacent said upright corner members of at least one said end of said frame, including a first latching pin receiving member adjacent said base of said frame and a second latching pin receiving member adjacent a plane defined by said shelf member in said shelf position.

4. An equipment transport cart as described in claim 3, wherein said shelf member is positionable to a second side wall position coincident with said second side of said frame.

5. A towable trailer for transporting luggage and other cargo, comprising:

a wheeled chassis;

a frame having a base, a first end, a second end, a first side and a second side, said base mounted to and said frame extending upwardly from said wheeled chassis;

a shelf member having a first end, a second end, a first side and a second side, said first end of said shelf member mounted to said first end of said frame and said second end of said shelf member mounted to said second end of said frame, said shelf member being pivotably and slidably connected to said first and second ends of said frame along an axis approximately midway between its said first side and its said second side and extending from its said first end to its said second end, said shelf member being selectively pivotable between a first side wall position coincident with said first side of said frame, a shelf position, and a second side wall position coincident with said second side of said frame;

means for slidable engagement between said shelf member and said frame; and latch means, whereby said shelf member may be releasably retained in one of said first side wall, shelf and second side wall positions.

6. An equipment transport cart, comprising:

a wheeled chassis;

a frame having a base, a first end, a second end, a first side and a second side, said base mounted to and said frame extending upwardly from said wheeled chassis;

said frame including first, second, third and fourth upright corner members, said first end of said frame extending between said first and second upright corner members, said second end of said frame extending between said third and fourth upright corner members, said first side of said frame extending between said first and third upright corner members, and said second side of said frame extending between said second and fourth upright corner members;

said frame further including first, second, third and fourth lateral brace members, said first lateral brace member extending between said first and second upright corner members, said second lateral brace member extending between said third and fourth upright corner members, said third lateral brace member extending between said first and third upright corner members, and said fourth lateral brace member extending between said second and fourth upright corner members;

a shelf member having a first end, a second end, a first side and a second side, said first end of said shelf member mounted to said first end of said frame and said second end of said shelf member mounted to said second end of said frame, said shelf member being pivotable along an axis approximately midway between its said first side and its said second side and extending from its said first end to its said second end, said shelf member being selectively pivotable between at least a first side wall position coincident with said first side of said frame and a shelf position;

means for slidable engagement between said shelf member and said frame;

said means for slidable engagement including first and second axial projections opposably extending from said axis of said shelf member, said first axial projection extending from said first end of said shelf member and said second axial projection extending from said second end of said shelf member;

said means for slidable engagement further including first, second, third and fourth end projections, said first end projection extending from said first end of said shelf member adjacent said first side of said shelf member, said second end projection extending from said first end of said shelf member adjacent said second side of said shelf member, said third end projection extending from said second end of said shelf member adjacent said first side of said shelf member, and said fourth end projection extending from said second end of said shelf member adjacent said second side of said shelf member;

said means for slidable engagement further including first and second axial channel members, said first axial channel member extending between and fixedly attached to said first and second upright corner members of said frame and slidably engageable with said first axial projection of said shelf member, and said second axial channel member extending between and fixedly attached to said third and fourth upright corner members of said frame and slidably engageable with said second axial projection of said shelf member; and said means for slidable engagement further including first, second, third and fourth channel members, said first channel member integral with and extending along a portion of said first upright corner member of said frame and slidably engageable with said first end projection of said shelf member, said second channel member integral with and extending along a portion of said second upright corner member of said frame and slidably engageable with said second end projection of said shelf member, said third channel member integral with and extending along a portion of said third upright corner member of said frame and slidably engageable with said third end projection of said shelf member, and said fourth channel member integral with and extending along a portion of said fourth upright corner member of said frame and slidably engageable with said fourth end projection of said shelf member; and latch means, whereby said shelf member may be releasably retained in said first side wall position, said shelf position or a second side wall position.

* * * * *

UNITED STATES PATENT AND TRADEMARK OFFICE
CERTIFICATE OF CORRECTION

PATENT NO. : 5,199,729

DATED : April 6, 1993

INVENTOR(S) : Sheldon H. Sievert; John H. Hoeper; John V. Silver

It is certified that error appears in the above-identified patent and that said Letters Patent is hereby corrected as shown below:

In col 3, ln 54, delete "ba" and substitute --bag-- therefor.

In col 4, ln 36, delete "5" and substitute --50-- therefor.

Signed and Sealed this

Twenty-eighth Day of December, 1993

*Attest:*

BRUCE LEHMAN

*Attesting Officer*     *Commissioner of Patents and Trademarks*